(12) United States Patent
Barnat et al.

(10) Patent No.: US 12,269,774 B2
(45) Date of Patent: Apr. 8, 2025

(54) PENETRATING PRIME EMULSION

(71) Applicant: ArrMaz Products Inc., Mulberry, FL (US)

(72) Inventors: James Barnat, Tulsa, OK (US); Joel Coates, Tulsa, OK (US)

(73) Assignee: ArrMaz Products Inc., Mulberry, FL (US)

( * ) Notice: Subject to any disclaimer, the term of this patent is extended or adjusted under 35 U.S.C. 154(b) by 796 days.

(21) Appl. No.: 17/505,892

(22) Filed: Oct. 20, 2021

(65) Prior Publication Data

US 2022/0119312 A1    Apr. 21, 2022

Related U.S. Application Data

(60) Provisional application No. 63/093,896, filed on Oct. 20, 2020.

(51) Int. Cl.
| | |
|---|---|
| *C04B 26/26* | (2006.01) |
| *C04B 24/12* | (2006.01) |
| *C09K 17/34* | (2006.01) |
| *E01C 7/36* | (2006.01) |
| *E01C 19/16* | (2006.01) |
| *E01C 21/00* | (2006.01) |
| *C04B 103/40* | (2006.01) |
| *C04B 111/00* | (2006.01) |
| *E01C 19/48* | (2006.01) |

(52) U.S. Cl.
CPC ............ *C04B 26/26* (2013.01); *C04B 24/123* (2013.01); *C09K 17/34* (2013.01); *E01C 7/36* (2013.01); *E01C 19/16* (2013.01); *E01C 21/00* (2013.01); *C04B 2103/40* (2013.01); *C04B 2111/00741* (2013.01); *C04B 2111/0075* (2013.01); *E01C 19/48* (2013.01)

(58) Field of Classification Search
CPC ... C04B 24/123; C04B 26/26; C04B 2103/40; C04B 2111/00741; C04B 2111/0075; E01C 7/36; E01C 19/16; E01C 19/48; E01C 21/00; C09K 17/34
USPC .... 404/17, 19, 31, 72, 75, 76, 101, 107, 111
See application file for complete search history.

(56) References Cited

U.S. PATENT DOCUMENTS

| | | | |
|---|---|---|---|
| 4,362,568 A | 12/1982 | Ostermeyer | |
| 5,596,032 A | 1/1997 | Schilling et al. | |
| 2002/0183401 A1 | 12/2002 | Wates et al. | |
| 2013/0129639 A1* | 5/2013 | Anderson | ............... A61P 31/10 424/70.13 |
| 2015/0098921 A1* | 4/2015 | Franzke | ................... A61K 8/60 424/70.13 |
| 2015/0159018 A1* | 6/2015 | Al-Mehthel | ............ C08L 95/00 106/668 |
| 2016/0215142 A1* | 7/2016 | Zhang | .................... C08L 95/005 |
| 2019/0003176 A1* | 1/2019 | Donelan | ................. E04C 2/528 |
| 2020/0140719 A1* | 5/2020 | Zha | .......................... E21F 5/02 |

FOREIGN PATENT DOCUMENTS

| | | | | |
|---|---|---|---|---|
| ES | 2698391 T3 | * | 2/2019 | ......... C04B 24/2676 |
| ES | 2786319 A2 | * | 10/2020 | ............. B01J 13/00 |
| KR | 10-1893791 B1 | | 8/2018 | |
| WO | 1997-36970 A2 | | 10/1997 | |
| WO | WO-2005092276 A1 | * | 10/2005 | ............... A61K 8/04 |
| WO | WO-2011137218 A1 | * | 11/2011 | ............. A61K 8/737 |

OTHER PUBLICATIONS

International Search Report and Written Opinion from Corresponding PCT Patent Application PCT/US21/55757 Mailed Feb. 10, 2022; Korean Intellectual Property Office.

* cited by examiner

*Primary Examiner* — Raymond W Addie
(74) *Attorney, Agent, or Firm* — Head, Johnson, Kachigian & Wilkinson, PC

(57) ABSTRACT

A bituminous emulsion that is capable of being used as a penetrating prime emulsion. The penetrating prime emulsion may be capable of penetrating compacted soil without the use of solvent, and may toughen quickly to allow early application of a paved layer on the surface. The bituminous emulsion may comprise bituminous material and an emulsifier comprising octylphenol ethoxylates, and optionally further comprising tallow diamine betaines or other betaines.

19 Claims, No Drawings

PENETRATING PRIME EMULSION

CROSS REFERENCE

This application is based on and claims priority to U.S. Provisional Application No. 63/093,896 filed Oct. 20, 2020.

BACKGROUND OF THE INVENTION

Field of the Invention

This invention relates generally to bituminous emulsions, and more particularly, but not by way of limitation, to a bituminous emulsion for use in road applications, specifically for use as a penetrating prime solution that is essentially solvent free.

Description of the Related Art

Building of a road generally starts with some preparation of a soil substrate and is possibly followed by a granular base. A surface layer or series or surface layers are applied to the granular base to form the final road structure. The granular base can become unstable from water intrusion or vehicular traffic. If this occurs, the paved layer may become unstable and delaminate, causing poor performance.

To increase the water proofing of the granular base and toughen the soil or granular base, a penetrating prime material is routinely used. The prime material is usually a bituminous material that is applied to the compacted surface of the granular or soil base to toughen and waterproof. When sufficiently hardened, the first paved layer is usually applied. See U.S. Pat. No. 4,364,568 for a good description.

In the bituminous materials industry, penetrating prime coats or similar materials were originally low viscosity binders that were applied to a surface and were designed to penetrate, bond, and stabilize. Bitumen viscosity is generally too high to penetrate a soil or granular base and thus bitumen viscosity is typically reduced with diluent to aid penetration. The type of diluent or solvent is highly variable. Solvents may be petroleum based, plant based, or even recycled materials like waxes, recycled motor oil products, limonene, vegetable oils, tall oils, and the like. The action of the viscosity-reduced bitumen is to penetrate the granule or soil base and harden over time. Generally, the lower the viscosity the quicker and deeper the binder soaks into the surface. If no surface layers are utilized, the coating may be called a dust palliative.

As the diluent evaporates, the viscosity of the binder increases and the surface toughens. Generally, a freshly coated surface would require a week or more time to sufficiently toughen before it became suitable for a paved layer. Unfortunately, the solvent would either volatilize into the atmosphere or up into the first paved layer, or even continue to migrate through the subgrade over time.

Later, emulsified bituminous materials were used as a penetrating prime coat. Unfortunately, emulsified asphalt did not penetrate the compacted granular base or soil substrate consistently. The emulsion may pool on the surface and eventually dry out, leaving a very sticky surface. To afford better penetration into the granule surface or soil, the emulsified asphalt prime materials included sufficient amounts of solvent to allow the bitumen to penetrate.

The production of the emulsions requires an emulsifier. Suitable emulsifiers include anionic, nonionic, cationic, zwitterionic, or amphoteric emulsifiers or a combination thereof. Generally, slow setting emulsifiers have been utilized to produce penetrating prime emulsions, like lignin amines, betaines, ethoxylated nonylphenols, ethoxylated alcohols, tall oil, resins, fatty amines, fatty amine ethoxylates, and blends thereof to name a few, as well as their corresponding salts and derivatives.

Solid or granular bases that are to be stabilized with asphalt emulsions can be of varying compacted level. Loose materials contain high air voids and many emulsified products work well to penetrate. As compaction increases, most asphalt emulsion products need solvents to assist in the penetration. There is currently no test to simulate compacted soil for the purpose of determining the penetration of a bituminous emulsion. Such test would separate the current art from reality for the patents on prime coat material generally fail to penetrate a compacted specimen.

Based on the foregoing, it is desirable to provide a bituminous emulsion for use as a penetrating prime solution.

It is further desirable for the bituminous emulsion to be essentially solvent free.

It is further desirable for the bituminous emulsion to toughen quickly.

It is further desirable to provide a test procedure to compact a soil sample to simulate compacted soil in the field to test the penetration of the bituminous emulsion.

SUMMARY OF THE INVENTION

In general, in a first aspect, the invention relates to a bituminous emulsion comprising binding material and emulsifier, the emulsifier comprising octylphenol ethoxylates at a rate of 0.05% to 10% by weight of the bituminous emulsion. The bituminous emulsion may further comprise a second emulsifier at a rate of 0.05% to 10% by weight of the bituminous emulsion. The second emulsifier may comprise betaines, such as tallow diamine betaines or tallow diamine ethoxylate betaines. The bituminous emulsion may be solvent free.

In a second aspect, the invention pertains to a method of creating and using a penetrating prime emulsion. The method may comprise selecting a binding material; producing an aqueous phase, the aqueous phase comprising an emulsifier, the emulsifier comprising octylphenol ethoxylates at a rate of 0.05% to 10% by weight of the penetrating prime emulsion; and emulsifying the binding material in a range of 5% to 75% binding material phase and 10% to 95% aqueous phase to produce the penetrating prime emulsion. The aqueous phase may further comprise a second emulsifier at a rate of 0.05% to 10% by weight of the penetrating prime emulsion. The second emulsifier may comprise betaines, such as tallow diamine betaines or tallow diamine ethoxylate betaines.

The method may further comprise applying the penetrating prime emulsion to a surface. The method may further comprise waiting three days, one day, 8 hours, or one hour and then applying a paved layer to the surface.

The method may further comprise testing the penetrating prime emulsion by applying it to a compacted soil specimen. The method may further comprise first creating the compacted soil specimen by: separating the aggregate to 100% passing the #8 sieve; adding 5% water to assist compaction; compacting at 100-135 psi or higher; drying out the sample overnight at +100 C; and cooling to room temperature.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a composition for the production of a bituminous emulsion. The bituminous emulsion may be particularly suited for use in road applications. More specifically, the bituminous emulsion may be suitable for use as a penetrating prime emulsion. The bituminous emulsion may be used as a penetrating prime solution that is essentially solvent free.

The bituminous emulsion, when applied to a surface, may toughen quickly enough and be suitable for application of a paved layer in less than a week, in less than a few days, in less than a day, or even in less than an hour. The surface may be a granular base, which may be understood to mean divided mineral materials from quarriers, bituminous mix aggregates, milled fragments, clinker or breeze, scoria and slags, and also concrete demolition recycling products, or other surface materials.

The bituminous emulsion may comprise binding material and an emulsifier. The bituminous material may be asphalt, coal tar, bitumen, resins, other suitable material, or a combination thereof. Within the context of the present invention, the expression "bituminous material" may be understood to mean natural bitumen and bitumens derived from a mineral oil and the resulting mixes thereof. Bitumens obtained by cracking and tars are also considered here as bituminous materials within the meaning of the present invention, and also the mixes which may result therefrom. Blown bitumens—residues of distillation, vacuum distillation, or precipitation, for example obtained by propane precipitation—are examples considered within the context of this invention. Also considered here are bitumens diluted using petroleum solvents, bitumens diluted using vegetable oils, and polymer bitumens. The bituminous materials listed above may be anhydrous, as much as is possible on the industrial production scale in question.

The emulsifier may be octylphenol ethoxylates and may be used in a quantity of 0.05% to 10% by weight of the emulsion. The octylphenol ethoxylates may be used alone or in combination with betaines, which may also be used in a quantity of 0.05% to 10% by weight of the emulsion. The betaines may preferably be tallow diamine betaines, or may be tallow diamine ethoxylate betaines.

Specifically, the reaction product for use herein may either be a methylated tallow alkyl diamine betaine or a ethoxylated (or polyethoxylated) tallow alkyl diamine betaine-type surfactant. The betaine-type amphoteric surfactant may be representable by the general formula:

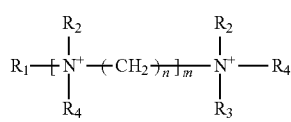

Where $R_1$ is an alkyl chain, saturated or unsaturated, containing from 10 to 20 carbon atoms.
Where $R_2$ can be H, $CH_3$ or a group —$(CH_2CH_2O)_p$—H
Where $R_3$ can be $CH_3$, —$(CH_2CH_2O)_p$—H or $R_2$
Where $R_4$ can be H or —$CH_2CO_2^-$ $Na^+$ Where n is an integer that can be from 0 to 3
Where m is an integer or any number greater than 0
Where p can be an integer number from 1 to 15

The process for obtaining these surfactants may be as follows: The amine, taken from a precursor of either a methylated tallow alkyl diamine or ethoxylated (or polyethoxylated) tallow alkyl diamine, is reacted with sodium 2-chloroacetate under mild reaction conditions, 75° C.-95° C., which favors fewer side products. The reaction is carried out in either water or a water-glycol blend in the presence of a base (sodium hydroxide) to keep the pH of the reaction mixture between 7 and 9. These reaction conditions afford a high conversion to the betaine-type amphoteric surfactant.

The bituminous emulsion may be created by first selecting a binding material, which may be asphalt, coal tar, bitumen, resins, other suitable material, or a combination thereof. Second, an aqueous phase may be produced by selecting a primary emulsifier, such as octylphenol ethoxylate, which may be used in a quantity of 0.05% to 10% by weight of the emulsion, and optionally selecting a secondary emulsifier, such as tallow amine betaine or other suitable emulsifiers, which also may be used in a quantity of 0.05% to 10% by weight of the emulsifier. Third, the binding material emulsion may be created by emulsifying the binding material in a range of 5% to 75% binding material phase and 10% to 95% aqueous phase.

The bituminous emulsion may be suitable for use as a penetrating prime emulsion. The penetrating prime emulsion may be applied to a surface. The emulsion may penetrate the surface, creating an essentially tack free surface. The emulsion may penetrate the surface in less than 1 hour, less than 30 minutes, less than 15 minutes, less than 5 minutes, or most preferably less than 1 minute. The emulsion may toughen quickly, allowing application of a paved layer in less than 3 days, less than 1 day, less than 8 hours, or most preferably less than 1 hour.

The bituminous emulsion may be tested by applying it to a simulated compacted soil specimen. The simulated compacted soil specimen may be produced according to the following steps:

1. Separate the aggregate to 100% passing the #8 sieve
2. Add 5% water to assist compaction
3. Compact at 100-135 psi or higher
4. Dry out the sample overnight at +100 C
5. Cool to room temperature This compacted specimen may then be used to determine the penetration of the bituminous emulsion. This test may separate the current art from reality for the patents on prime coat material generally fail to penetrate a compacted specimen.

Examples

Simulated compacted soil specimens prepared as described above were used to test a variety of emulsions, both with and without fuel oil as a solvent. In each instance, the emulsion was applied to the simulated compacted soil specimen. The time in seconds for the emulsion to soak into the compacted soil specimen was recorded, as was the condition of the cured surface.

The results of testing with a typical chemistry is shown below:

| Nouryon RedicoteE-11 | 1# FO | Sec | Penetration Depth mm | Cured Surface |
|---|---|---|---|---|
| 2.0% | 30% | 231 | 5 | Non Tacky or Adhesive |
| 2.0% | 20% | 300+ | 3 | Tacky and Adhesive |
| 2.0% | 10% | 300+ | 2 | Very Tacky and Adhesive |
| 2.0% | 0% | 300+ | 1 | Very Tacky and Adhesive |
| PG 58-28 Asphalt | | | | |

As fuel oil is added, eventually the emulsion soaks into the compacted substrate. In this case, E-11 requires up to 30% fuel oil to penetrate the surface in less than 5 minutes. At 20% or less, the surface after full penetration is still tacky or very tacky to the touch (sticky) whereby tires of vehicles will probably pick-up the asphalt layer as traffic drives. This is a typical chemistry used and is considered as state of the art.

Non-ionic chemistry, specifically ethoxylated nonylphenols, do not work at all:

| NPE 30 | 1# FO | Sec | Penetration Depth mm | Cured Surface |
|---|---|---|---|---|
| 2.0% | 30% | 300+ | 1 | very tacky and adhesive |
| 2.0% | 20% | 300+ | 1 | very tacky and adhesive |
| 2.0% | 10% | 300+ | 1 | very tacky and adhesive |
| 2.0% | 0% | 300+ | 1 | very tacky and adhesive |
| PG 58-28 Asphalt | | | | |

Surprisingly, octylphenol ethoxylated was found to work well, without the necessity of fuel oil:

| Octylphenol Ethoxylate, 30 mol | 1# FO | Sec | Penetration Depth mm | Cured Surface |
|---|---|---|---|---|
| 1.5% | 0% | 41 | 3 | Non Tacky or adhesive |
| 1.3% | 0% | 52 | 3 | Tacky and Adhesive |
| 1.0% | 0% | 132 | 1 | Very Tacky and Adhesive |
| PG 58-28 Asphalt | | | | |

Even at lower chemical loadings, the octylphenol ethoxylate penetrates very quickly, almost instantaneously, and at 1.25% or higher, the use of octylphenol ethoxylate creates a suitable surface for repaving.

Lastly, a combination of emulsifiers was found to be even more preferred. One non-limiting example is as follows:

| Octylphenol Ethoxylate, 30 mol | Tallow Diamine Betaine | Total Emulsifier | Sec | Penetration Depth mm | Cured Surface |
|---|---|---|---|---|---|
| 1.50% | 0.50% | 2.00% | 16 | 6 | Non Tacky or Adhesive |
| 1.13% | 0.38% | 1.51% | 18 | 4 | Non Tacky or Adhesive |
| 0.75% | 0.25% | 1.00% | 27 | 3 | Non Tacky or Adhesive |
| PG 58-28 Asphalt | | | | | |

The octylphenol ethoxylate and betaine also perform remarkable in dust control applications without the need for fuel oil. Typical dust control dilutions like at 20% solids, penetrate deep with no residual tack:

| Octylphenol Ethoxylate, 30 mol | Tallow Diamine Betaine | Total Emulsifier | Sec | Penetration Depth mm | Cured Surface |
|---|---|---|---|---|---|
| 1.50% | 0.50% | 2.00% | 2 | 7 | Non Tacky or Adhesive |
| PG 58-28 Asphalt | | | | | |

This is opposed to Nouryon RedicoteE-11, which requires high percentages of fuel oil to perform:

| Nouryon RedicoteE-11 | 1# FO % | Sec | Penetration Depth mm | Cured Surface |
|---|---|---|---|---|
| 2.00% | 20% | 52 | 6 | Non Tacky or Adhesive |
| 2.00% | 0% | 25 | 2 | Tacky and Adhesive |
| PG 58-28 Asphalt | | | | |

Whereas, the devices and methods have been described in relation to the drawings and claims, it should be understood that other and further modifications, apart from those shown or suggested herein, may be made within the spirit and scope of this invention.

What is claimed is:

1. A bituminous emulsion comprising:
   binding material;
   emulsifier, the emulsifier comprising octylphenol ethoxylates at a rate of 0.05% to 10% by weight of the bituminous emulsion; and
   a second emulsifier at a rate of 0.05% to 10% by weight of the bituminous emulsion wherein the second emulsifier comprises tallow diamine betaine.

2. The bituminous emulsion of claim 1 where the tallow diamine betaines is methylated tallow alkyl diamine betaine.

3. The bituminous emulsion of claim 1 where the tallow diamine betaines is ethoxylated or polyethoxylated tallow alkyl diamine betaine.

4. The bituminous emulsion of claim 1 where the bituminous emulsion is solvent free.

5. A method of creating and using a penetrating prime emulsion, the method comprising:
   selecting a binding material;
   producing an aqueous phase, the aqueous phase comprising:
      an emulsifier, the emulsifier comprising octylphenol ethoxylates at a rate of 0.05% to 10% by weight of the penetrating prime emulsion; and
      a second emulsifier at a rate of 0.05% to 10% by weight of the penetrating prime emulsion wherein the second emulsifier comprises tallow diamine betaine; and
   emulsifying the binding material in a range of 5% to 75% binding material phase and 10% to 95% aqueous phase to produce the penetrating prime emulsion.

6. The method of claim 5 where the tallow diamine betaines is methylated tallow alkyl diamine betaine.

7. The method of claim 5 where the tallow diamine betaines is ethoxylated or polyethoxylated tallow alkyl diamine betaine.

8. The method of claim 5 where the penetrating prime emulsion is solvent free.

9. The method of claim 5 further comprising applying the penetrating prime emulsion to a surface.

10. The method of claim 9 further comprising:
waiting three days; and
then applying a paved layer to the surface.

11. The method of claim 9 further comprising:
waiting one day; and
then applying a paved layer to the surface.

12. The method of claim 9 further comprising:
waiting 8 hours; and
then applying a paved layer to the surface.

13. The method of claim 9 further comprising:
waiting one hour; and
then applying a paved layer to the surface.

14. The method of claim 5 further comprising testing the penetrating prime emulsion by applying it to a compacted soil specimen.

15. The method of claim 14 further comprising first creating the compacted soil specimen by:
separating the aggregate to 100% passing the #8 sieve;
adding 5% water to assist compaction;
compacting at 100-135 psi or higher;
drying out the sample overnight at +100 C; and
cooling to room temperature.

16. A method of dust control, the method comprising:
applying a bituminous emulsion to a surface, the bituminous emulsion comprising binding material, emulsifier, and a second emulsifier, the emulsifier comprising octylphenol ethoxylates at a rate of 0.05% to 10% by weight of the bituminous emulsion and the second emulsifier at a rate of 0.05% to 10% by weight of the bituminous emulsion and where the second emulsifier comprises tallow diamine betaine.

17. The bituminous emulsion of claim 16 where the tallow diamine betaines is methylated tallow alkyl diamine betaine.

18. The bituminous emulsion of claim 16 where the tallow diamine betaines is ethoxylated or polyethoxylated tallow alkyl diamine betaine.

19. The bituminous emulsion of claim 16 where the bituminous emulsion is solvent free.

* * * * *